W. E. NICKERSON.
WORK SUPPORTING AND FEEDING MECHANISM.
APPLICATION FILED FEB. 11, 1918.

1,333,589.

Patented Mar. 9, 1920.
7 SHEETS—SHEET 1.

Fig. 1.

INVENTOR=
Wm. E. Nickerson,
By E. D. Chadwick,
HIS ATTORNEY=

Fig. 4.

W. E. NICKERSON.
WORK SUPPORTING AND FEEDING MECHANISM.
APPLICATION FILED FEB. 11, 1918.

1,333,589.

Patented Mar. 9, 1920.
7 SHEETS—SHEET 6.

INVENTOR:
Wm E. Nickerson,
By E. D. Chadwick,
HIS ATTORNEY.

W. E. NICKERSON.
WORK SUPPORTING AND FEEDING MECHANISM.
APPLICATION FILED FEB. 11, 1918.

1,333,589.

Patented Mar. 9, 1920.
7 SHEETS—SHEET 7.

UNITED STATES PATENT OFFICE.

WILLIAM E. NICKERSON, OF CAMBRIDGE, MASSACHUSETTS, ASSIGNOR TO GILLETTE SAFETY RAZOR COMPANY, OF BOSTON, MASSACHUSETTS, A CORPORATION OF DELAWARE.

WORK SUPPORTING AND FEEDING MECHANISM.

1,333,589.     Specification of Letters Patent.     Patented Mar. 9, 1920.

Application filed February 11, 1918. Serial No. 216,606.

*To all whom it may concern:*

Be it known that I, WILLIAM E. NICKERSON, a citizen of the United States, residing at Cambridge, in the county of Middlesex and State of Massachusetts, have invented certain new and useful Improvements in Work Supporting and Feeding Mechanism, of which the following is a specification.

My invention relates to means for supporting pieces of work and presenting them to the action of tools by which they are operated upon, and includes features which can be advantageously employed in a variety of machines for performing such operations as sawing, boring, reaming, punching, grinding and the like on wood, metal or other materials. The invention is particularly applicable to machines which operate on small pieces of work introduced one by one by an attendant, in that it provides a work-carrying mechanism on which each piece of work can be readily placed without stopping the machine and without danger to the attendant, and which thereafter operates automatically until it is ready to receive the next piece of work. The principal features of the invention reside in the construction of the work support and its operating mechanism, in the means employed for securely clamping the work to the support while being operated upon and for subsequently releasing and ejecting it, in an arrangement whereby chips produced by the operating tools may be collected and saved, and in certain other parts and details explained below.

The specific embodiment of the invention hereinafter described is a gang sawing machine the purpose of which is to form the guard teeth of a double-edged safety razor by slotting the opposite edges of the metal plate on which the guard is formed. This machine as preferably constructed is illustrated in the accompanying drawings, in which:—

The working parts of the machine illustrated are carried by a frame comprising a horizontal table 2 provided with legs 3 and carrying side uprights 4—4 which extend upward from the table and are connected by transversely-extending tie-rods 5 and 6. The operating tools, which in this case consist of two gangs of circular saws 7, are carried by two parallel horizontal shafts 8 and 9 journaled in the upper ends of the uprights 4—4, one gang of saws on each shaft. These two shafts are geared together by intermeshing gears 10, so that they rotate in opposite directions, and the shaft 8 serves as the driving shaft of the machine, being provided with a belt pulley 11 whereby it is connected to a suitable source of power and rotated in such direction (indicated by the arrow in Fig. 2) that both gangs of saws cut downwardly with respect to a piece of work presented to them simultaneously from below.

Figure 3:
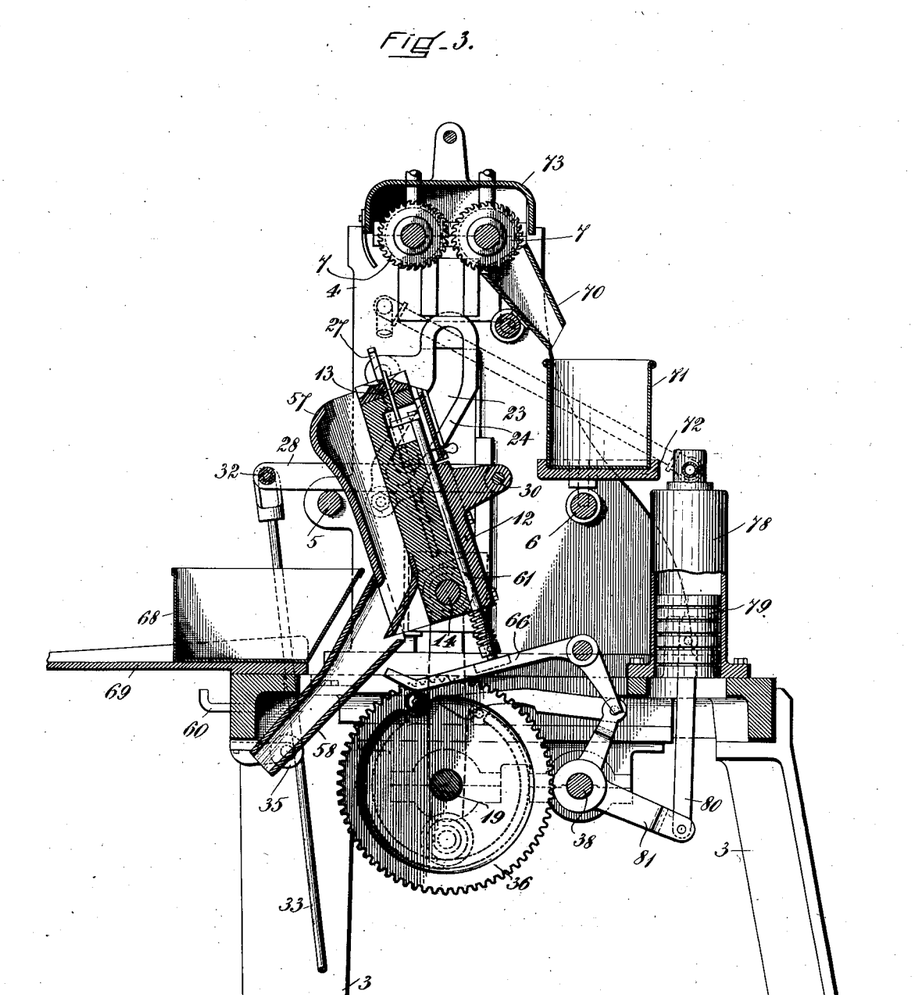
Fig. 3 is mainly a central vertical section through the machine from front to back, showing the work support in its lowermost position.
Figure 4:
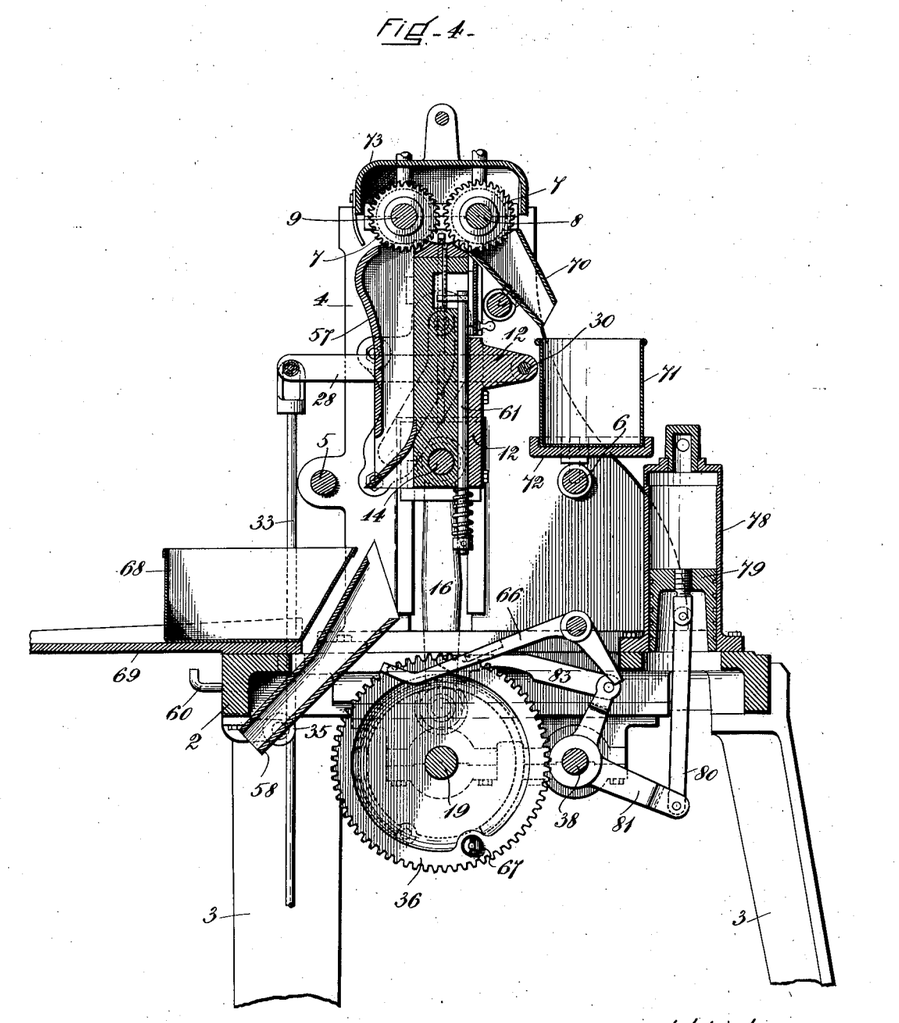
Fig. 4 is a similar view showing the work support in its uppermost position.

The work support 12, which resembles in contour an upright block having its lower end laterally extended in both directions, is located below the saws 7 and is provided at its upper end with a seat 13 on which each piece of work rests while being operated upon. The work is presented to and withdrawn from the saws by reciprocating the work support 12 vertically, which is accomplished by pivotally mounting the lower end of the support on a horizontal cross-rod 14 carried by blocks 15 sliding in guide slots in the uprights 4 and having its ends connected by rods 16 to the crank pins 17 on a pair of crank disks 18, these disks being secured to the ends of a countershaft 19 which is journaled in bearings 20 secured to the table 2 beneath the latter and is driven from the shaft 8 as hereinafter described. In addition to its upward and downward movements the work support 12 has a tilting movement produced by a pair of rollers 21 mounted on pins 22 projecting laterally from opposite sides of the support and moving respectively in cam slots 23 formed in fixed vertical brackets 24 bolted to the uprights 4 between the latter and the work support. The slots 23 are so shaped that when the work support is in its lowermost position, shown in Fig. 3, its upper end is tilted forward to a position in which the attendant can conveniently place a piece of work upon the seat 13, and thereafter as the work support moves upward it is first restored to an upright position and then moved vertically to the position shown in Fig. 4, in which the work is acted on by the saws.

Figure 9:
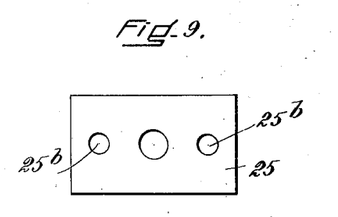
Fig. 9 is a plan view of one of the pieces of work before it has been operated upon by the machine.
Figure 10:
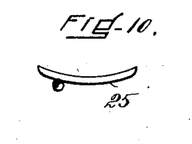
Fig. 10 is an end view of the same.
Figure 11:
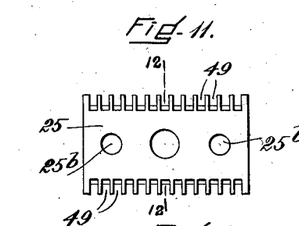
Fig. 11 is a plan view of one of the pieces of work after it has been operated upon.
Figure 12:
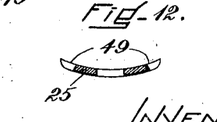
Fig. 12 is a section on the line 12—12 in Fig 11.

The pieces of work, one of which is shown at 25 in Figs. 9 to 12, are accurately positioned on the seat 13 when placed thereon by means of a pair of pins 25$^a$ carried by and projecting upward from the upper end of the work support 12 and adapted to enter the perforations 25$^b$, Figs. 9 and 11. Each piece of work while thus positioned is clamped in place by laterally-extending fingers 26 overlying its ends and formed respectively on the exposed upper ends of two bars 27, which slide longitudinally in the work support and are operated by a pair of levers 28 each of which passes freely through a slot 29 in the corresponding bar and is pivotally supported at its rear end upon a suitable fulcrum, such as a transversely-extending rod 20 carried by the support 12. The levers 28 also pass through slots 31 formed in the work support and long enough to provide for the bar-operating movements of the levers, and at their front ends the latter are connected by a transversely-extending rod 32 on which is suspended a frame 33 carrying a weight 34 at its lower end. The levers and frame are thus adapted to move upward and downward with the work support and when the support is in its uppermost position a piece of work resting on the seat 13 is firmly held in place by the weighted frame acting through the levers 28 and bars 27 on the clamping fingers 26. During the downward movement of the work support, however, said levers come in contact with and are arrested by the top of the tie-rod 5, whereupon the continued downward movement of the support brings the fingers 26 into the position shown in Fig. 3 and thus releases the piece of work, which is then removed from the seat 13 and replaced by another piece. The latter is held in place by the attendant until it is grasped by the fingers 26, which occurs as soon as the bars 27 are sufficiently retracted by the relative upward movement of the support, and thereupon the support continues its upward movement with the work firmly clamped thereon as above described. Since the levers 28 can slide freely backward and forward on the top of the tie-rod 5 they do not interfere with the tilting movements of the work support, and the frame 33 is prevented from swinging during such movements by means of rollers 35 secured to the table 2 in position to receive and guide the side rods of the frame while the latter is at and near its lowermost position.

The countershaft 19 is rotated by a gear 36 secured thereto and meshing with a pinion 37 on another countershaft 38 journaled below the table 2, a gear 39 secured to the latter countershaft and meshing with an intermediate gear 40 which in turn meshes with a pinion 41 on a countershaft 42 journaled in one of the uprights 4, and a gear 43 secured to the latter countershaft and meshing with a pinion 44 on a short countershaft 45 which is supported as hereinafter described and carries a belt pulley 46 connected by a belt 47 to a pulley 48 on the driving shaft 8. These driving connections are so proportioned that the countershaft 19 rotates much more slowly than the shafts 8 and 9, so that the work is fed to the saws at a suitable rate. The slots cut by the saws in the edges of the pieces of work are shown at 49 in Figs. 11 and 12.

Figure 13:
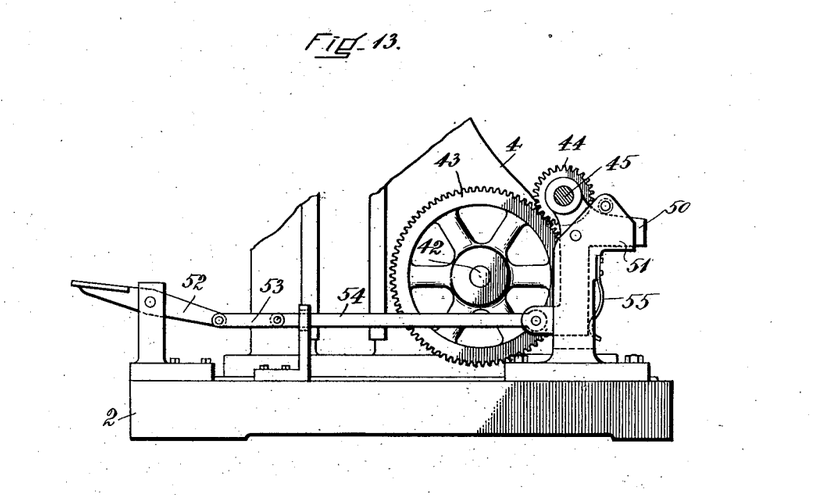
Fig. 13 is a detail view showing in side elevation a stop mechanism hereinafter described.
Figure 14:
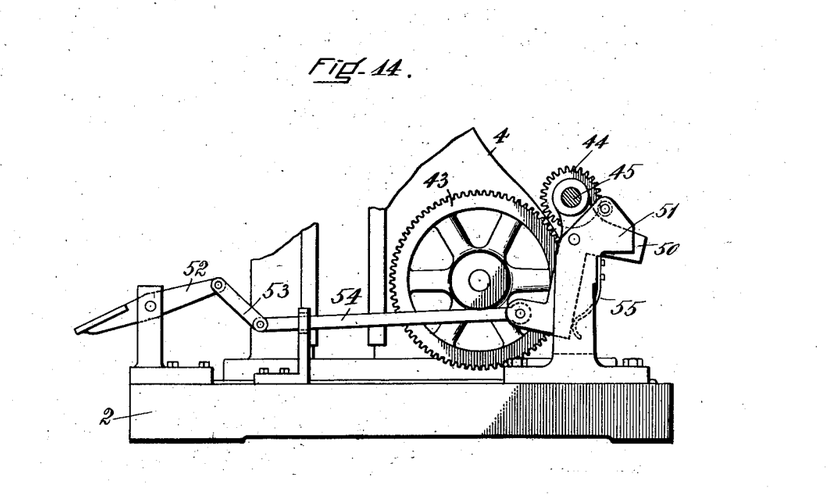
Fig. 14 is a similar view showing the stop mechanism in a different position.

In order that the work support may be instantly arrested in any position without throwing off the power from the machine, I prefer to include a stop mechanism in the connections between the driving shaft 8 and the countershaft 19. A suitable mechanism for this purpose is illustrated in Figs. 13 and 14, wherein the countershaft 45 is shown as journaled in a bracket 50 pivotally mounted on a fixed support 51 in such manner that the pinion 44 can be engaged with or disengaged from the gear 43 by rocking the bracket 50 on its pivot. This is done by means of a pivoted lever 52 the rear end of which is connected to the bracket 50 by a link 53 and a sliding rod 54 pivoted to each other and to the lever and bracket respectively, and so arranged that they hold the gear 43 and pinion 44 in mesh by assuming a dead-center position when the front end of the lever 52 is elevated, as shown in Fig. 13. To stop the work support the attendant depresses the front end of the lever 52, thereby moving the parts 52, 53 and 54 out of dead-center position, whereupon a spring 55 acting on the bracket 50 rocks the latter and throws the gear 43 and pinion 44 out of mesh.

Figure 1:
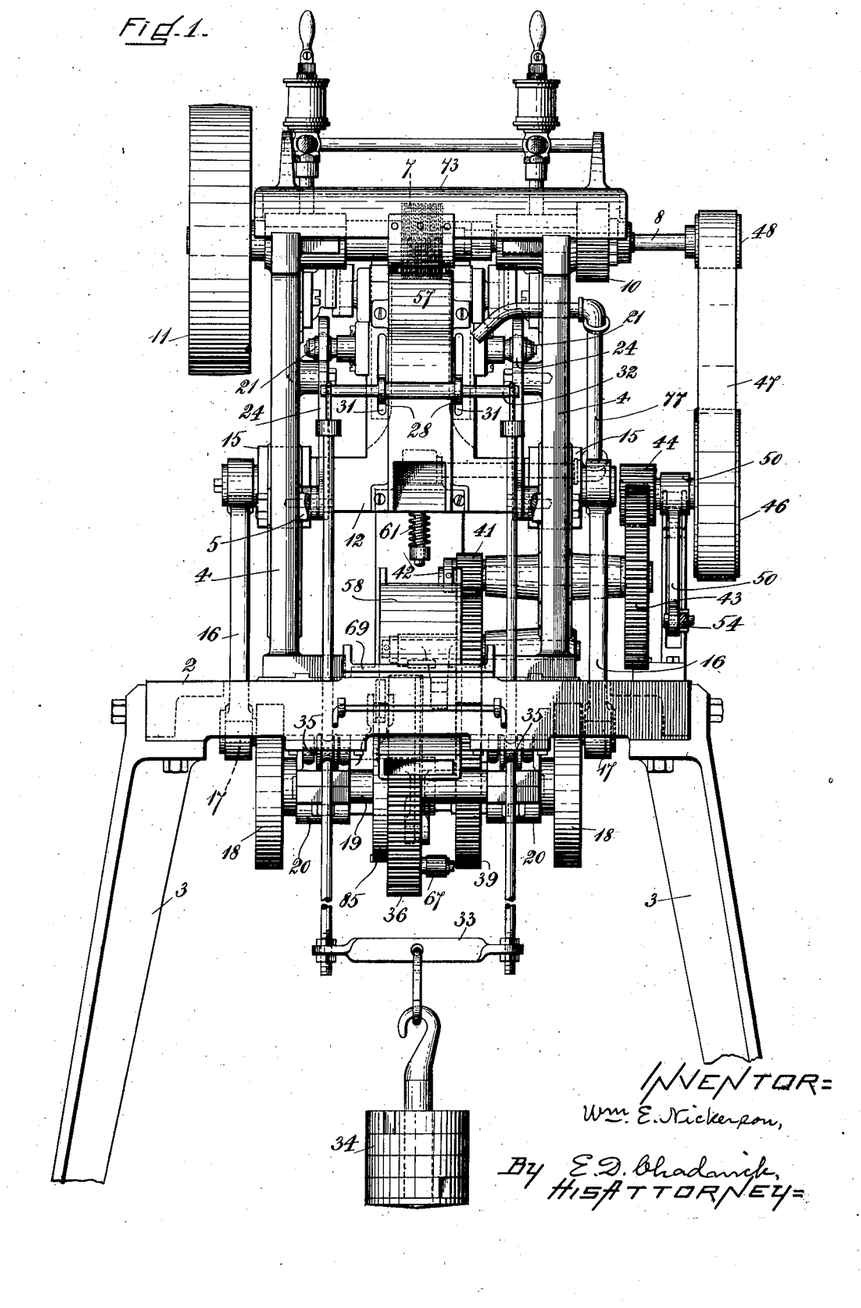
Figure 1 is a front elevation of the machine with a few of the parts broken away.
Figure 2:
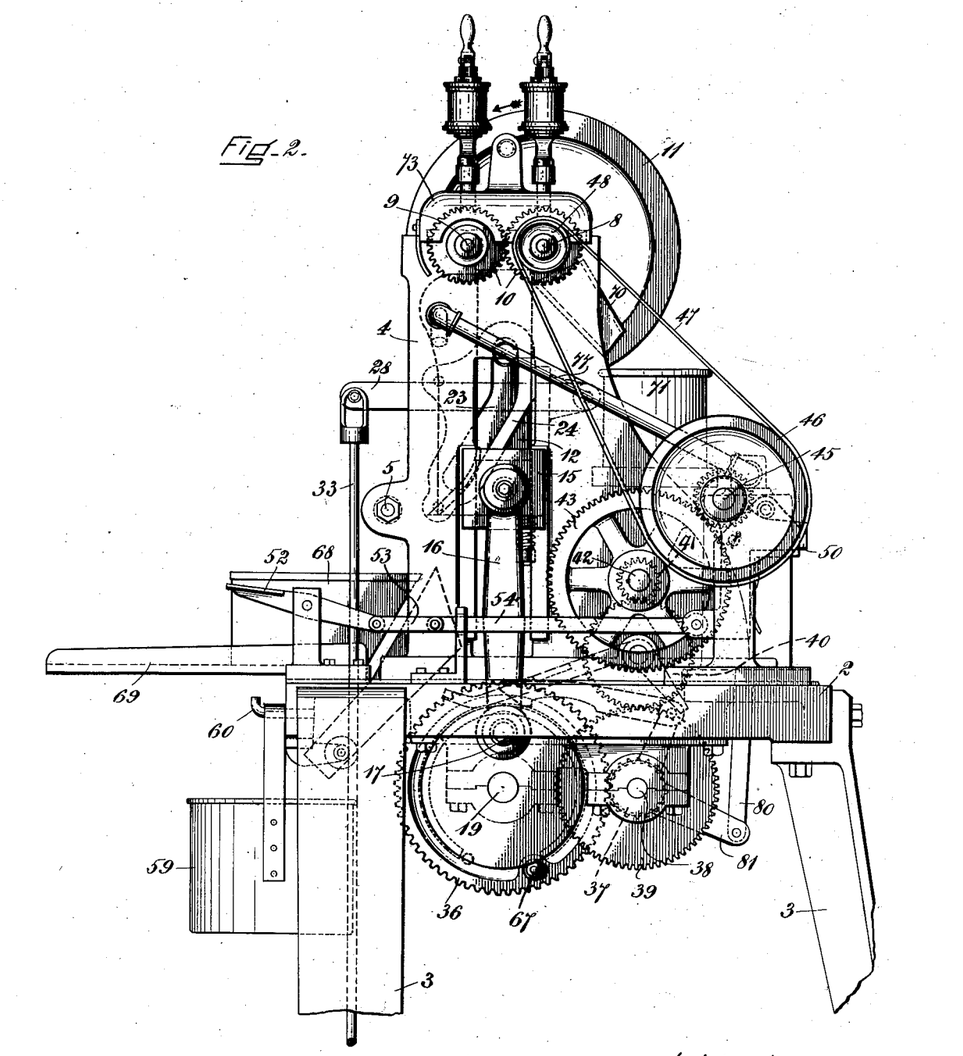
Fig. 2 is an elevation of the right hand end of the machine.

In addition to the features above described my invention includes an ejecting mechanism whereby the pieces of work when released are automatically removed from the work support, an arrangement for collecting and saving the chips produced by the operating tools, and means for removing chips from the seat on which the work rests. The ejecting mechanism comprises a pair of pins 56 which slide upward and downward in the upper portion of the work support 12 and are so located that when moved upward with reference to the support their upper ends project above the seat 13 near enough to the rear edge of the latter to cause a piece of work resting on the seat to tilt forward until it falls off the top of the support, whence it drops into a chute 57 carried by the support and extending downwardly in front of the latter. The ejecting movement of the pins 56 occurs just before the work support reaches its lowermost position and is assisted by the inclination of the support, and when the support is in this position the lower end of the chute 57 is located over the open upper end of a fixed chute 58 whereby each piece of work falling through the chute 57 is conducted into a receptacle 59 suspended on a hook 60, as shown in Fig. 2.

For operating the pins 56 I employ a rod 61 which slides in the work support 12, parallel with the pins 56, and projects at its lower end below the support, where it is provided with a spring 62 tending to force it downward. At its upper end the rod 61 carries a forwardly-extending plate 63 which moves in a recess 64 formed in the work support and is provided with a pair of notches 65 each of which receives one of the pins 56, each pin being provided near its lower end with a laterally-flattened portion which enters the corresponding notch 65 and locks the pin to the plate 63. The rod 61 is moved upward as the work support approaches its lowermost position by a pivotally supported lever 66 operated by a laterally-projecting roller 67 carried by the gear 36, and as soon as said roller passes the lever 66 the latter drops until its rear end comes in contact with the rear portion of the table 2, which acts as a stop to hold the lever in position to be operated by the roller 67 during the next succeeding rotation of the gear 36. The downward movement of the rod 61 is stopped by the engagement of the plate 63 with the bottom of the recess 64 after the pins 56 have been withdrawn below the seat 13.

Figure 5:
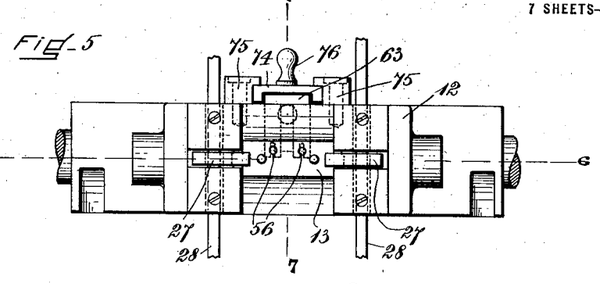
Fig. 5 is a top plan view of the work support, drawn to a larger scale.
Figure 6:
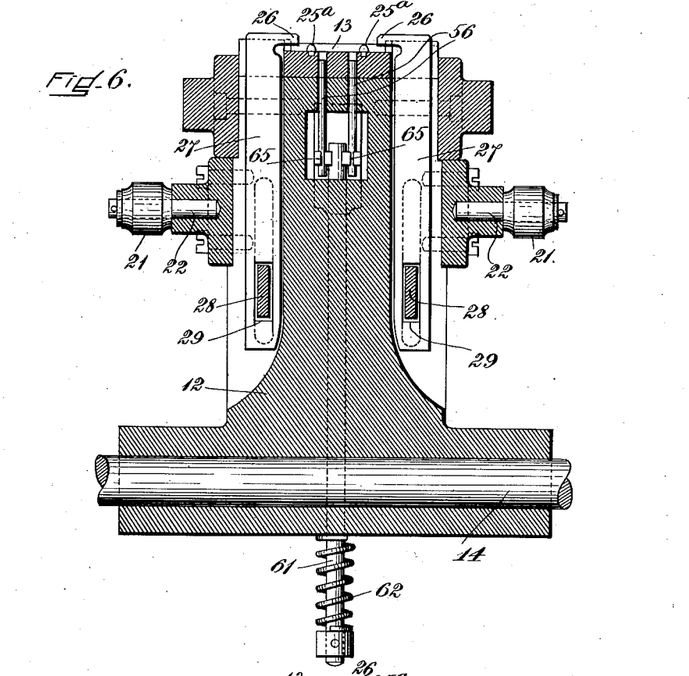
Fig. 6 is a section on the line 6—6 in Fig. 5.
Figure 7:
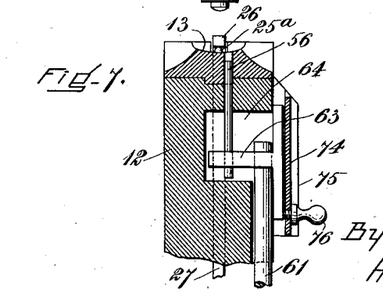
Fig. 7 is a section on the line 7—7 in Fig. 5.
Figure 8:
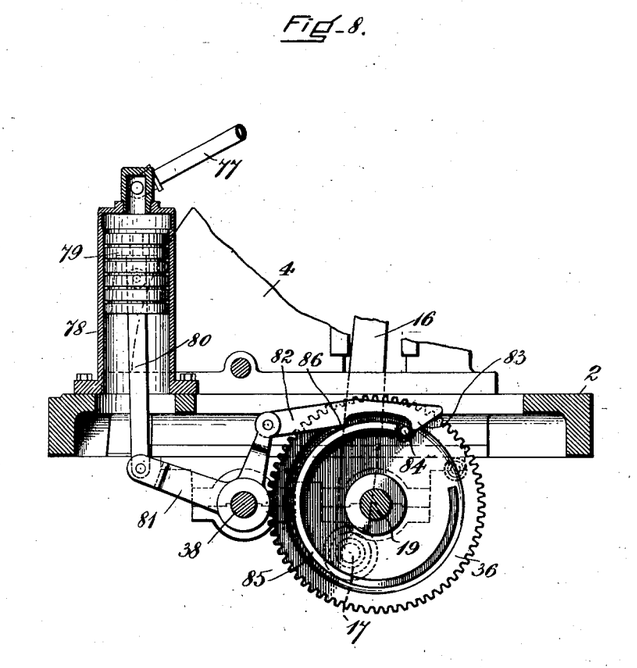
Fig. 8 is a detail view of a blowing mechanism hereinafter described, shown partly in vertical section and partly in side elevation as viewed from the left hand end of the machine.

For collecting the chips produced by the front saws 7 I make use of the chute 57, the open upper end of which is located directly beneath and close to the saws at the time when the work support 12 is in its uppermost position. At this time the lower end of the chute 57 is located in position to discharge into a removable receptacle 68 resting on a shelf 69 carried by the table 2, so that the chips produced by the front saws are thrown downward and forward into the upper end of the chute 57, drop through the latter and are discharged into the receptacle 68. The chips produced by the rear saws 7 are thrown downward and backward into the open upper end of a fixed chute 70 carried by the uprights 4 and arranged to discharge into a removable receptacle 71 resting on a shelf 72 supported by the rear tie-rod 6. A housing 73 carried by the frame of the machine and extending horizontally above the saws prevents the chips from being dispersed in an upward direction, and a plate 74 normally covering the recess 64 in the work support prevents stray chips from entering said recess and interfering with the operation of the ejecting pins 56 and the rod 61. The plate 74 is arranged to slide in guides 75, Figs. 5 and 7, and is provided with a handle 76 so that it can be readily removed to give access to the recess 64.

The seat 13 on the work support is freed from chips which might otherwise collect on it by means of a blast of air discharged through a fixed pipe 77, the open end of which is located in such position as to direct the air blast upon the seat 13 when the latter is in its lowermost position. The pipe 77 may be connected to any available supply of air under pressure and provided with means for controlling the air blast, or the blast may be produced by a pump forming a part of the machine and consisting, for example, of an upright cylinder 78 secured to the table 2 and connected at its upper end to the pipe 77, and a piston 79 operated through the open lower end of the cylinder by a connecting rod 80. The lower end of the rod 80 is pivoted to one end of a bell crank lever 81 carried by and arranged to turn on the countershaft 38 previously referred to, and to the other end of the lever 81 is pivoted the rear end of an arm 82 provided near its front end with a hook 83 adapted to drop over and be engaged by a pin 84 carried by the gear 36 on the opposite side of the latter from the roller 67. During the greater part of each rotation of the gear 36 the hook 83 rests on and is supported by a concentric rib 85 carried by said gear, but just before the ejecting pins 56 operate a gap in the rib 85 is brought beneath the hook 83, whereupon the latter drops and is immediately engaged by the pin 84. The arm 82 is then drawn forward by said pin, thereby causing the piston 79 to move rapidly upward in the cylinder 78 and force a strong current of air through the open end of the pipe 77. This operation is immediately followed by the disengagement of the hook 83 and pin 84, the hook being pried off the pin by the rib 85 acting on an intermediate fulcrum formed on the arm 82 at the point 86, and then the piston 79 falls by its own weight and the hook 83 is drawn backward over the rib 85, on which it rests until again permitted to drop into the gap above referred to.

It will be seen that in operating the machine above described, nothing is required of the attendant except to place the pieces of work one by one upon the seat 13 and hold them there until clamped, and since this is done while the seat 13 is in a readily accessible position there is no danger of injury to the attendant by the moving parts. The blowing mechanism, the work-ejecting mechanism and the chip-collecting arrangement are not indispensable but they contribute to the automatic action and economy of the machine and are desirable for that reason. The saws employed in the specific machine illustrated could obviously be replaced by tools for performing various other operations without materially affecting the construction or mode of operation of the other parts, and these parts themselves can be modified in various ways without departing from my invention.

I claim:—

1. In a machine of the character described, the combination with operating tools of a work support located below them, means for imparting to the work support a straight-line movement toward and away from the tools, means for moving the upper end of the support forward when lowered, and means for clamping and unclamping the work while resting on the support.

2. In a machine of the character described, the combination with operating tools of a work support located below them, means for imparting to the work support a straight-line movement toward and away from the tools, means for moving the upper end of the support forward when lowered, means for clamping and unclamping the work while resting on the support, and means for ejecting the work when unclamped.

3. In a machine of the character described, the combination with operating tools of an upright work support located below them and having a seat for the work at its upper end, means for raising and lowering the support vertically, means for tilting its upper end forward when lowered, and means for clamping and unclamping the work while resting on the seat.

4. In a machine of the character described, the combination with operating tools of an upright work support located below them and having a seat for the work at its upper end, means for raising and lowering the support vertically, means for tilting its upper end forward when lowered, means for clamping and unclamping the work while resting on the seat, and means for ejecting the work when unclamped.

5. In a machine of the character described, the combination with operating tools of an upright work support movable upward and downward beneath them and having its lower end pivotally supported, means for raising and lowering the support, means for tilting it on its pivotal axis, and means for clamping and unclamping the work while resting on the upper end of the support.

6. In a machine of the character described, the combination with operating tools of an upright work support movable upward and downward beneath them and having its lower end pivotally supported, means for raising and lowering the support, means for tilting it on its pivotal axis, means for clamping and unclamping the work while resting on the upper end of the support, and ejecting means arranged to lift the rear edge of the work when unclamped and while the support is tilted forwardly.

7. In a machine of the character described, the combination with operating tools of upright guides, a cross-rod movable upward and downward therein, means for reciprocating the cross-rod, a work support pivotally mounted on said rod, and means for tilting the work support when lowered.

8. In a machine of the character described, the combination with operating tools of upright guides located below them, a cross-rod movable upward and downward in the guides, means for reciprocating the cross-rod, an upright work support pivotally mounted on said rod and provided above the latter with a seat on which the work rests, and means comprising cam slots and studs movable therein for tilting the work support during its upward and downward movements.

9. In a machine of the character described, the combination with operating tools of upright guides located below them, a cross-rod movable upward and downward in the guides, means for reciprocating the cross-rod, an upright work support pivotally mounted on said rod near its lower end and having at its upper end a seat on which the work rests, fixed brackets provided with cam slots having vertical upper portions and downwardly and forwardly slanting lower portions, and laterally-projecting studs carried by the upper portion of the work support and moving in said cam slots.

10. In a machine of the character described, the combination with operating tools of a work support movable toward and away from them, work-clamping means provided with a weight movable with the support and adapted to hold the clamping means upon the work while presented to the tools, and means for arresting the weight during the movement of the support away from the tools, thereby unclamping the work.

11. In a machine of the character described, the combination with operating tools of a work support located below them, means for raising and lowering the support, work-clamping devices carried by the support and movable with respect to the same, weighted links pivoted to the support at one end and arranged to hold the clamping devices upon the work when the support moves upward, and means for arresting the links when the support moves downward, thereby unclamping the work.

12. In a machine of the character described, the combination with operating tools of a pivotally-mounted work support located below them and having a seat for the work at its upper end, means for raising and lowering the support, means for tilting its upper end forward when lowered, work-clamping devices carried by the support, weighted links pivoted to the support at one end and arranged to hold the clamping devices upon the work while presented to the tools, and a stop located below the links in position to arrest them during the downward movement of the support.

13. In a machine of the character described, the combination with operating tools of an upright work support located below them and having a seat for the work at its upper end, means for raising and lowering the support, an ejector carried by the support, and means for operating the ejector while the support is lowered.

14. In a machine of the character described, the combination with operating tools of a pivotally-mounted work support located below them and having a seat for the work at its upper end, means for raising and lowering the support and for tilting its upper end forward when lowered, an ejector carried by the support and movable upward and downward therein in position to lift the rear edge of the work, a spring for moving the ejector downward with respect to the support, and means for moving the ejector upward while the support is lowered and tilted forward.

15. In a machine of the character described, the combination with operating tools of a work support located below them, means for raising and lowering the support, means for clamping and unclamping the work, a chute carried by the support and adapted to discharge into a receptacle, and means for ejecting the work into the chute.

16. In a machine of the character described, the combination with operating tools of a pivotally-mounted work support located below them and having a seat for the work at its upper end, means for raising and lowering the support, means for tilting its upper end forward when lowered, means for clamping and unclamping the work, a chute carried by the support in position to discharge into a receptacle when lowered, and means for ejecting the work into the chute.

17. In a machine of the character described, the combination with operating tools of a pivotally-mounted work support located below them, means for raising and lowering the support, means for tilting it on its pivotal axis, means for clamping and unclamping the work, a chute carried by the support and adapted to discharge into a receptacle, and ejecting means arranged to lift one edge of the work while unclamped and tilt it into the chute.

18. In a machine of the character described, the combination with operating tools of a work support located below them, means for clamping and unclamping the work, means for raising and lowering the support, and a chute carried by the support in a position to receive chips from the tools and discharge them into a receptacle while the support is raised.

19. In a machine of the character described, the combination with operating tools of a work support located below them and provided at its upper end with a seat for the work, means for raising and lowering the support, means for clamping and unclamping the work, a chute carried by the support and having its upper end located adjacent to said seat, the lower end of the chute being arranged to discharge into different receptacles when the support is in its raised and lowered positions, and means for ejecting the work into the chute while the support is lowered.

20. In a machine of the character described, the combination with operating tools of a pivotally-mounted support located below them and having a seat for the work at its upper end, means for raising and lowering the support and for tilting its upper end forward when lowered, means for clamping and unclamping the work, a chute carried by the support in front of the latter and arranged to receive chips from the tools and discharge them into a receptacle while the support is raised, means for ejecting the work into the upper end of the chute while the support is lowered and tilted forward, and means for conveying the work from the chute into another receptacle.

21. In a machine of the character described, the combination with operating tools of a work support located below them and having a seat for the work at its upper end, means for raising and lowering the support, a pipe arranged to discharge air upon the seat when the support is lowered, and means for forcing a current of air through the pipe.

22. In a machine of the character described, the combination with operating tools of a work support located below them and provided with a seat on which the work rests, a rotating shaft and means operated thereby for raising and lowering the support, a pipe arranged to discharge air upon the seat, and a pump operated by said shaft and timed to force a current of air through the pipe when the support is lowered.

23. In a machine of the character described, the combination of a driving shaft, tools operated directly by said shaft, a work support located below the tools, a countershaft and means operated thereby for raising and lowering the work support, connections between the driving shaft and the countershaft for operating the latter, and means included in said connections for stopping the countershaft without affecting the driving shaft.

Signed at Boston, Mass., this 8th day of February, 1918.

WILLIAM E. NICKERSON.